May 15, 1945.   W. M. BACON   2,376,111
TELEGRAPH SYSTEM
Filed Aug. 26, 1942   6 Sheets-Sheet 3

INVENTOR
W. M. BACON
BY William F. Simpson
ATTORNEY

FIG. 6

May 15, 1945.    W. M. BACON    2,376,111
TELEGRAPH SYSTEM
Filed Aug. 26, 1942    6 Sheets-Sheet 6

INVENTOR
W. M. BACON
BY
ATTORNEY

Patented May 15, 1945

2,376,111

UNITED STATES PATENT OFFICE 2,376,111

TELEGRAPH SYSTEM

Walter M. Bacon, New York, N. Y., assignor to Bell Telephone Laboratories, Incorporated, New York, N. Y., a corporation of New York Application August 26, 1942, Serial No. 456,148

6 Claims. (Cl. 178—3)

This invention relates to telegraph receiving and recording apparatus and more particularly to telegraph recording apparatus in which some form of stationery or recording medium passes through two or more advancing mechanisms or positions through the recording equipment or telegraph apparatus.

More specifically, in accordance with this invention, a tape or stationary control contact, such as disclosed in an application of T. L. Corwin, entitled Web controlled indicator, Serial No. 456,206, filed on the same date herewith, is employed in cooperation with receiving equipment and switching circuits disclosed in the United States patent application of Branson et al., Serial No. 448,878, filed June 27, 1942, so that upon the failure of the stationery or tape to be properly advanced through both positions, the record controlled contact, such as disclosed in said Corwin application is actuated to cause an alarm or other signal for attracting the attention of the maintenance force and also causes the machine in trouble to test busy so that no further messages may be directed to this machine until the trouble is corrected. In addition, when these contacts are actuated the transmitter transmitting to the equipment in trouble is stopped and an additional alarm or indicator is actuated to indicate which one of the transmitters was transmitting to the equipment in trouble.

When the contacts are provided and connected to control the switching equipment as described, the number of messages lost and required to be retransmitted is considerably reduced and, in addition, the work of the maintenance force and attendants is also reduced because the source of trouble of this particular type is at once brought to the attention of the operating personnel and also because the particular machine and equipment in trouble are at once indicated, thus indicating both the presence and location of the trouble within the system.

Furthermore, by stopping the transmitter transmitting to the equipment in trouble it is possible for the message then in progress of transmission to be readily reinserted in the transmitter and properly transmitted to the proper recording instrument without requiring the message to be retransmitted from the station of origin and thus without the loss of the message as has been entailed heretofore. The disclosures of the foregoing patent applications are hereby incorporated herein by reference to the same extent as if they were set forth in full herein.

In accordance with the rules of the Patent Office, applicant has not repeated the disclosure of these applications herein but has shown only sufficient of the circuits and apparatus of said application with which the present invention cooperates to enable one skilled in the art to fully understand the present invention and to adapt it for use in systems of the type disclosed in said Branson et al. application, as well as in similar systems.

Thus, in accordance with the present invention, the same contacts or switching device are actuated in the same manner in response to both a reduction in quantity of tape between two fixed points in the system or mechanism, and also to an excess of tape between the two or more points and these contacts control the switching circuits in a such a manner that the recording instrument in trouble is made busy, the transmission to it stopped and alarm and indicating devices actuated for indicating both the type of trouble and locating the equipment subjected to the trouble.

The foregoing objects and features of this invention may be more readily understood by reference to the drawings which illustrate the typical embodiment of this invention incorporating the specific contact arrangement disclosed in said application of Corwin filed herewith as applied to the specific telegraph system described in detail in said application of Branson et al., Serial No. 448,878, June 27, 1942. It is understood that this invention is not limited to the specific embodiment set forth herein nor to the specific type of switching system disclosed in said Branson et al. application but it may take other forms and be applied to other types of stationery or record employing devices as will be readily understood by those skilled in the art. The novel features of this invention are specifically set forth in the claims appended hereto.

Referring to the drawings,

Fig. 1A illustrates the manner in which Figs. 2, 3 and 4 are arranged adjacent each other to show in outline form the various circuits and equipment described in the patent application of Branson et al. referred to hereinbefore;

Fig. 1B shows the manner in which Figs. 5 and 6 are placed adjacent each other to illustrate specific details of one form of applicant's invention particularly well suited to its incorporation in the system, such as set forth in the above-identified Branson et al. application;

Figs. 2, 3 and 4 show in outline form a typical telegraph switching system to which applicant's invention is particularly well adapted;

The features of the structure of this contact which appear to be novel, but not claimed herein, are set forth and claimed in the above-identified application of Corwin filed under even date herewith. The features of the switching equipment which may be novel but not claimed herein are set forth and claimed in said above-identified application of Branson et al.

Corresponding parts of the apparatus and circuits are designated by the same characters in an effort to facilitate the understanding of this invention.

Figure 7:
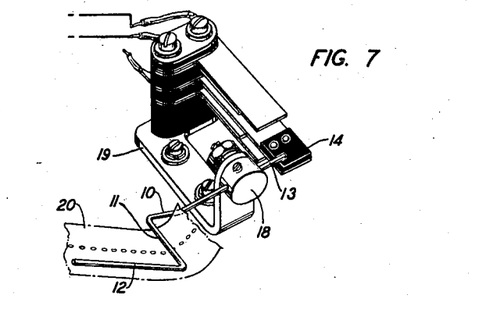
Figs. 7, 8, 9 and 10 show details of a typical contact arrangement and its mode of operation as employed in this invention in cooperation with switching circuits, such as described in said patent application of Branson et al.
Figure 8:
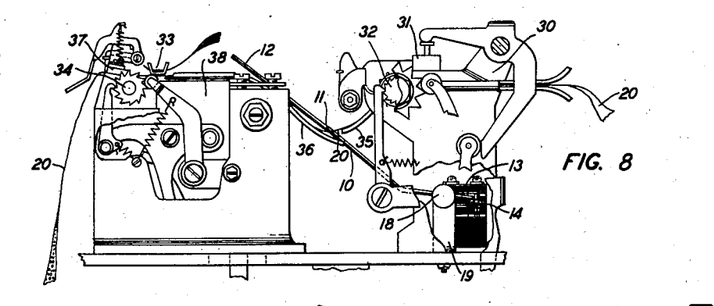
Figure 9:
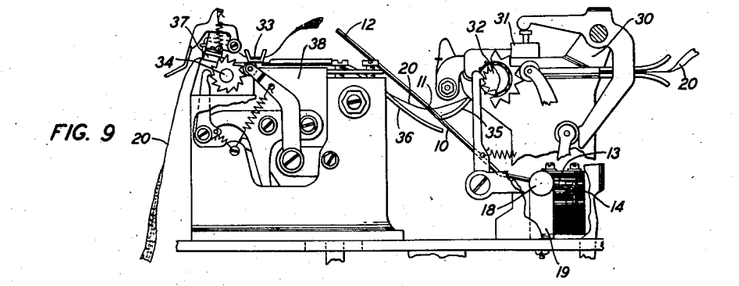

Considering first the mechanical features of the switching or contact arrangement shown in Figs. 7 through 9, and more particularly Fig. 7, 14 represents an extension of the switching apparatus or contact device represented herein by a transfer contact arrangement, that is, a contact provided with both a make and break contact. With the contact member 14 at its normal position, the break contacts are maintained closed, while the make contacts are open.

In order to actuate the contacts, the contact control member 10 is rotated in a clockwise direction as viewed in Fig. 7. The end 13 of the control lever 10 will then move member 14 downward, open the break contacts and close the make contacts.

Control member 10 is supported by a pivot 18 free to rotate under control of the tape 20. The control member 10 is provided with an offset portion 11 which rests upon or above the tape and an extension arm 12 which also cooperates with tape 20 as will be described hereinafter. As pointed out above, extension 13 of control member 10 cooperates with the contact actuating member 14. The member 14 is preferably made of insulating material and attached to a movable member of the contacts or switching apparatus to be controlled.

Figure 10:
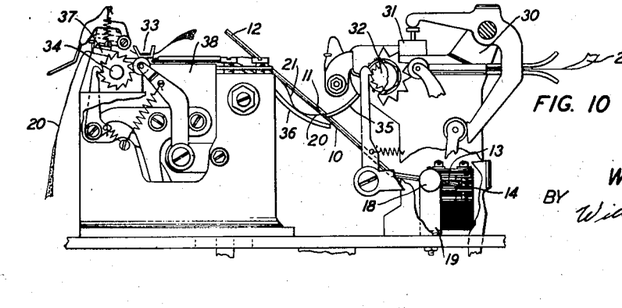

As shown in Figs. 8, 9 and 10, this control device is attached to printing reperforator of the type disclosed in the above-identified copending application of Branson et al. As disclosed in said copending application, the tape or stationery 20 passes through a feedhole punch mechanism 30 having a feedhole punch block 31 and a feeding mechanism 32. The tape then passes over guides 35 and 36 to a printing and code perforation apparatus shown generally at 38. The printing position is illustrated at 33 and the code perforation punch block indicated by reference numeral 37. A second tape feeding mechanism 34 is employed to advance the tape through the printing and code perforating positions in the recording instrument.

The control member 10 is mounted upon the base of this instrument in such a manner that both the offset portion 11 of control member 10 and extension 12 rest on or above the tape.

As shown in Fig. 8, the control member 10 and the tape 20 are shown in the normal position with the extension 12 of control member 10 resting upon guide 36. Generally the extension 12 of the control member rests upon this guide with the paper or tape 20 between the extension 12 and guide 36.

It sometimes happens that for some reason or other, one or the other of the feed mechanisms fails to properly advance the tape 20 through the recording mechanism so that the supply of tape 20 between the feedhole perforating mechanism 30 and the message recording mechanism 38 either becomes reduced below a predetermined minimum or else exceeds some predetermined maximum quantity.

If the supply of tape 20 is interfered with, the feed mechanism 32 will generally tear the tape between the feedholes. This will interfere with the normal advancing of the tape through the feedhole perforating mechanism 31 and inasmuch as the feed mechanism 34 will continue to operate normally for a short interval of time, the supply of tape between the feed punch block 31 and the code punch block 37 will be reduced. This condition is shown in Fig. 9. The reduction of tape between these two positions in the machine will cause the control member 10 to rotate in a clockwise direction about pivot 18 due to the tape engaging the offset portion 11 of control member 10 and lifting this portion. The rotation of member 10 in a clockwise direction will cause the extension 13 to engage the contact actuating member 14 and actuate the switching apparatus to cause the contacts to open or close, or both, as shown in Fig. 7.

If the tape 20 becomes stuck in passing through the recording or perforating apparatus 38 instead of prior to or during the passage through the perforating mechanism 30, as described above, an excess of tape will accumulate between the feedhole perforating mechanism and the message recording mechanism as shown in Fig. 10. When this occurs the tape will bulge and form a loop due to the action of member 10 and guides 35 and 36 as shown at 21 due to the action of the guide members 35 and 36. The bulge 21 will engage the extension 12 of the control member 10 and again rotate this member in a clockwise direction and cause the contacts controlled by member 14 to be actuated in the same manner as when the supply of tape between the feedhole punch position and the recording position was reduced to a predetermined minimum quantity.

Thus the contacts controlled by member 14 are actuated in the same manner both by reduction in the normal amount of tape between these two points and by an excess of tape between them.

Figures 1A, 1B, 2:
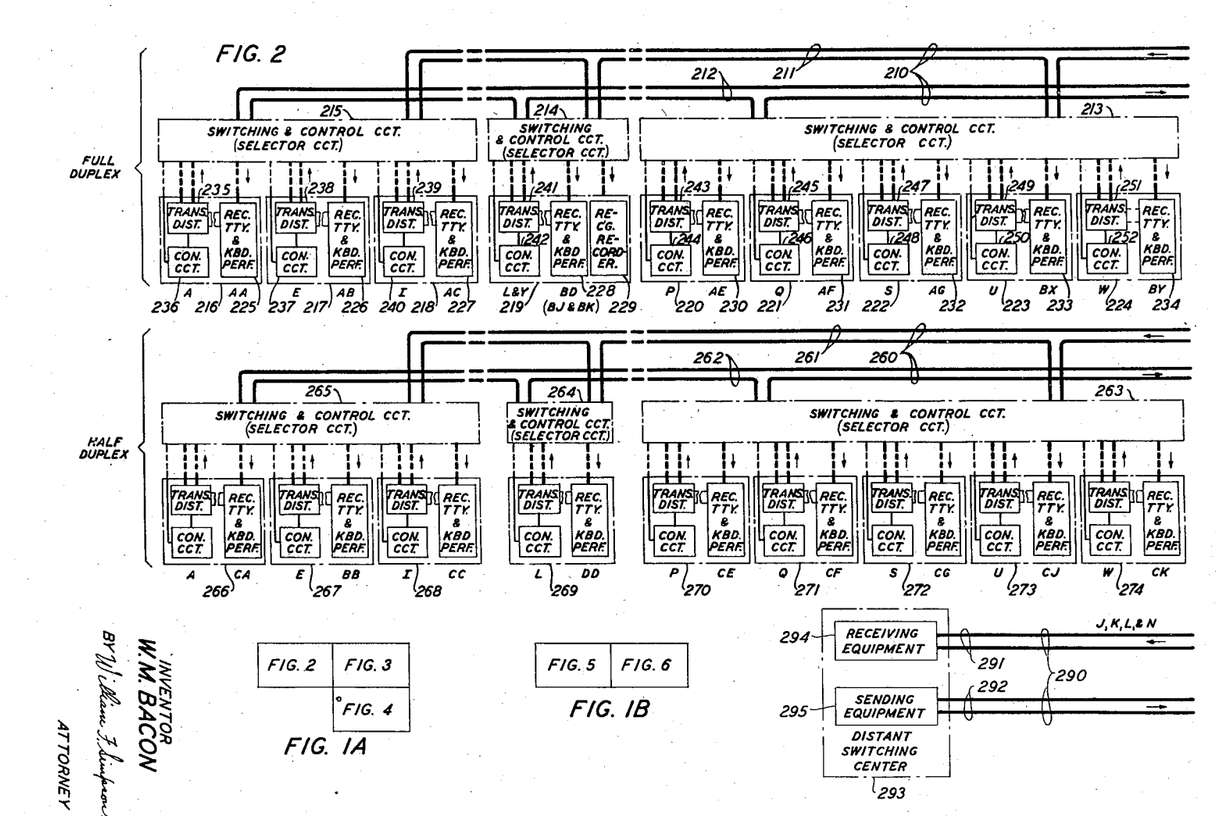
Figure 3:
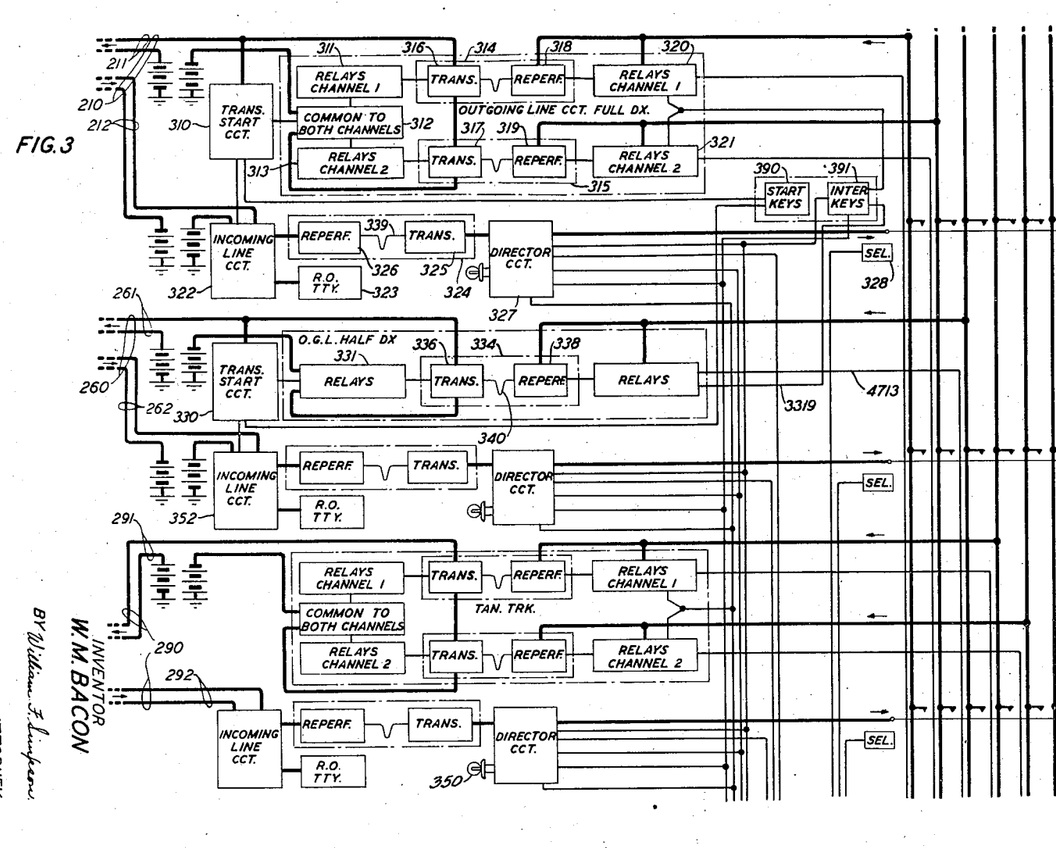
Figure 4:
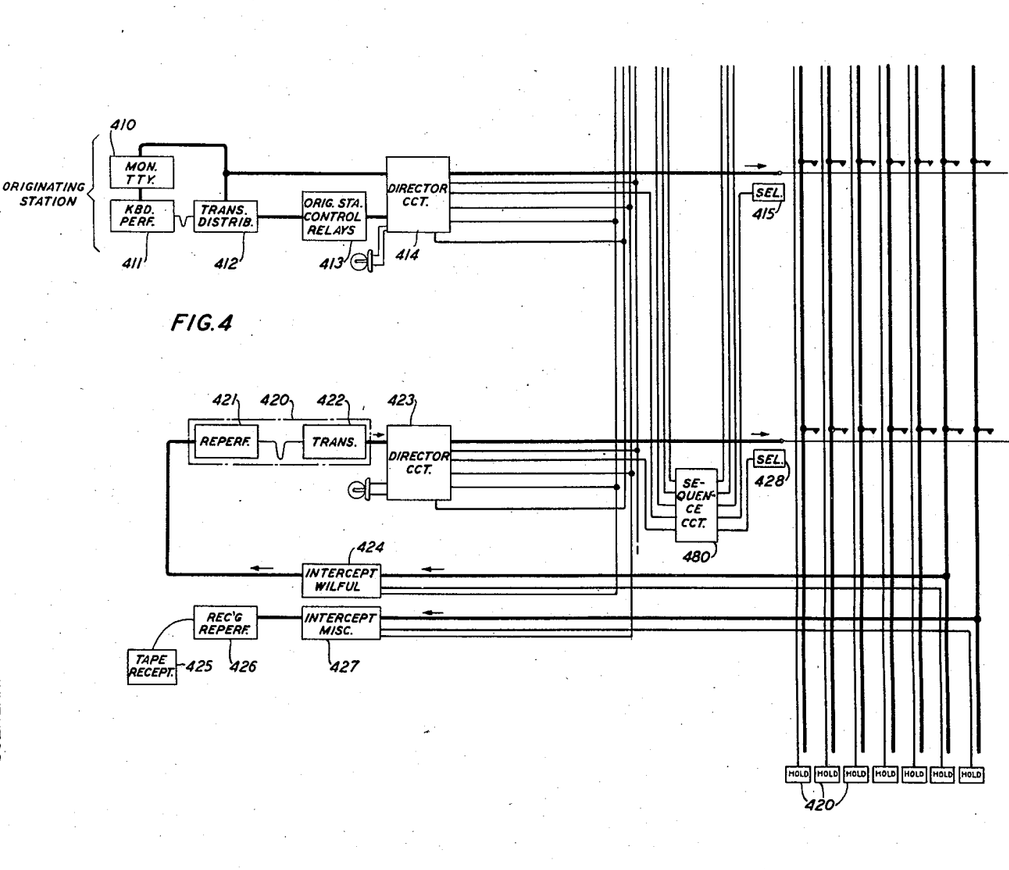

In accordance with the present invention, this contact is incorporated in a switching system described in said above-identified application of Branson et al., which switching system is shown in outline form in Figs. 2, 3 and 4 when positioned as shown in Fig. 1A.

Briefly, the system comprises a plurality of party lines 210 and 260. These party lines comprise receiving channels 211 and 261 respectively, for the transmission of signals from a central switching center shown in Figs. 3 and 4 to the respective stations served by these party lines. The party lines also include transmission channels 212 and 262 respectively, for the transmission of signals and from the outlying stations to the central switching center. As described in the above-identified application of Branson et al., these party lines may be arranged to operate either on a full duplex or half duplex basis. The party line 210 is assumed to be a full duplex party line, while the line 260 is assumed to be a half duplex party line. As will be well understood by those skilled in the art, any number of full duplex and half duplex lines may be provided. As shown in the drawings, full duplex party line 210 extends to the secondary switching centers 213, 214 and 215. These switching centers control the stations 216 through 224 inclusive. Party line 260 extends to the secondary control centers 265, 264 and 263 which centers, in turn, control the stations 266 through 274 inclusive.

Lines 290 represent a channel extending from switching center shown in Figs. 3 and 4 to a second switching center 293. This channel or trunk includes a channel 291 for transmitting messages from the switching center shown in Figs. 3 and 4 to the second switching center 293 where receiving equipment 294 is associated therewith. The trunk 290 also includes a second channel 292 for transmission of signals from the sending equipment 295 at the second switching center 293 to the central exchange shown in Figs. 3 and 4.

The party lines 210 and 260, as well as the trunk circuit 290, may include any suitable type of telegraph transmission channel. As shown in the drawings, these lines are shown as two one-way full metallic transmission paths in an effort to avoid further complication of the disclosure. It is to be understood, however, that these transmission paths may include one or more of the following types of telegraph transmission systems and in actual practice will usually combine a number of the different following types of transmission paths and as will be readily understood by those skilled in the art, the transmission paths of the different lines will vary from section to section independent of the type of transmission apparatus employed in any of the other lines or trunk circuits or sections.

Briefly, these lines and channels may include both full and half duplex low frequency telegraph lines or channels which may be operated either on a ground return or full metallic basis and which channels may comprise telegraph channels of composited telephone and telegraph lines of any of the well-known composite systems including simplex and phantom circuits as well as so-called Morse legs of cable quads. These channels may also include channels of the so-called time division multiplex telegraph systems for the transmission of signals in either one or both directions.

The telegraph transmission channels may also include channels of voice frequency carrier telegraph systems as well as channels of high frequency carrier current telegraph systems and also radio channels.

These party lines may also include the usual types of terminal and interconnecting equipment for the various types of communication systems employed as well as the usual types of amplifiers and repeaters including regenerative repeaters and volume compensators and other regulators and control equipment generally employed with systems of the respective types. Inasmuch as the respective types of telegraph systems operate in their usual manner and are well understood by those skilled in the art, they have not been shown in the drawings but merely represented by two one-way telegraph channels for each of the lines of the system.

As set forth in the above-identified Branson et al. application, the party lines terminate at the central exchange in equipment individual to each of the lines. The incoming channel party line 212 terminates in an incoming line circuit 322. The incoming line circuit causes the message to be recorded either by receiving only teletypewriter 323 when the messages are intended for the central switching station or upon a combined reperforator and transmitter 324 comprising reperforating unit 326 and a transmitting unit 325. The transmitter 325 is associated with the director circuit 327 which controls a crossbar or other type of switch including the selector magnet 328 and the holding magnets 420 and causes the transmitter to be connected to some channel extending towards the party line for which the message is intended.

As described in the said Branson et al. application, each message is preceded by a plurality of address characters, which characters control the directing circuit 327 and cause transmitter 325 to be connected to the proper channel extending toward the station of address under control of these address characters. Each of the outgoing lines is provided with one or more channels of transmission through the crossbar switch. The party line 210 is provided with two sets of channels and each channel provided with a group of relays individual thereto illustrated symbolically at 320 and 321. Each of the channels is also provided with combined reperforating and transmitting instruments 314 and 315. The transmitting units of these instruments are arranged to transmit alternately over the receiving channel of the party line 210 and are provided with various control relays 311, 312 and 313. A transmitter start circuit 310 is also associated with the receiving channel or party line 210 for transmitting transmitter start signals or control patterns over this channel. These transmitter start patterns control the switching equipment at the secondary switching center and cause the associated transmitters to be started into operation when they are supplied with stored message material available for transmission.

The secondary switching centers also respond to at least certain of the address characters and cause the receiving equipment controlled by them to be selectively and operatively connected to the receiving channel of the party line in accordance with address characters so that the respective receiving equipments will receive the message intended for them.

The other party lines of the trunk circuits are similarly equipped with the various circuits as described above. In the case of the half duplex lines only one channel through the crossbar switch will generally be provided since half duplex lines will only be provided when traffic or messages for the stations and lines connected thereto are not heavy. No transmitter start circuit has been shown for the trunk circuit because such a circuit generally will be unnecessary since there will be no transmitters to be started under control of the central switching center. With these exceptions, the equipment provided for each of the lines and trunks operates in substantially the same manner and performs substantially the same function.

Message originating equipment comprising monitoring teletypewriters 410, keyboard perforators 411, transmitters 412, control relays 413 and director circuit 414 is provided at the central switching station for the transmission of messages from the station to any of the other stations of the system.

In addition, a miscellaneous intercepting circuit 427, a receiving reperforator 426, and tape receptacle 425 are provided for the reception of improperly addressed messages and other messages which fail to properly control the switching equipment.

A willful intercept circuit 424 and a combined reperforator and transmitter 420 comprising a reperforator unit 421 and a transmitting unit 422, together with a director circuit 423, are provided for the reception of certain messages intended for stations which it is desired, for one reason or another, to intercept and prevent transmission to their ultimate station of destination at the particular moment.

The operation of the circuits of such a typical switching system has been described in greater detail in the above-identified Branson et al application and need not be repeated here. It is to be understood, however, that equipment and circuits of this invention cooperate with circuits of said Branson et al application as will be described hereinafter.

More specifically, in accordance with the present invention, the reperforating devices 318, 319, 325, 338 and 421, as well as the other reperforating devices employed in this system including reperforating equipment associated with the trunk 290, may be provided with the tape controlled contacts and control circuits in accordance with this invention. The manner in which these contacts control the switching circuits may be more readily understood by reference to Figs. 5 and 6. Here contacts 14 are controlled by the control member 10 of the reperforator 506. Contacts 14 cooperate with other contacts of the reperforator 506 and control relays and circuits, Fig. 6, as will be described hereinafter.

Figure 5:
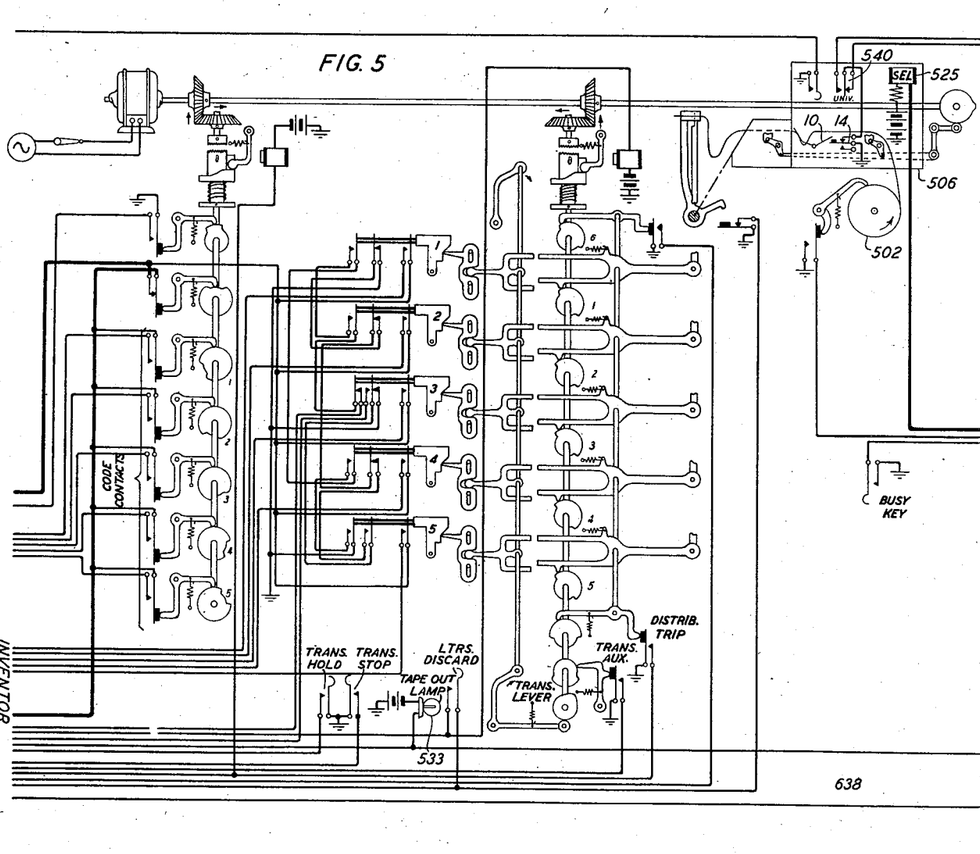
Figs. 5 and 6 show details of the certain circuits of said switching system described in said Branson et al. application, with which the improved contacts cooperate to first make the equipment in question busy; to, second, indicate the type of trouble and its location, and third, to stop transmission to the equipment in trouble as soon as the contacts in question are actuated.
Figure 6:
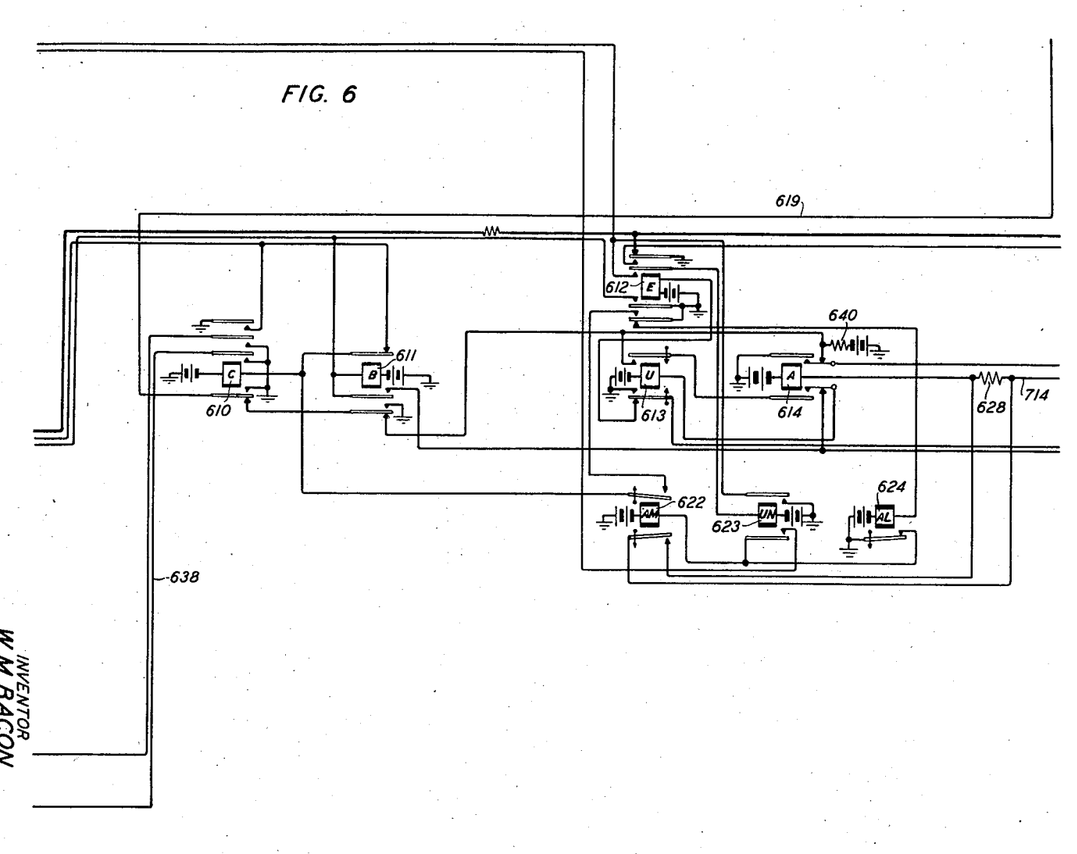

Specifically, Figs. 5 and 6 are identical with Figs. 45 and 46 of the above-identified application of Branson et al. except that the representation within the box 506 designating the reperforator has been slightly altered in order to provide sufficient space for showing contacts 14 and connecting them in series with the armature of the universal contacts 540. Figs. 5 and 6 of the drawings appended hereto, could, therefore, be substituted, without change, for Figs. 45 and 46 of said Branson et al. application.

Fig. 5 could likewise be substituted for Figs. 19, 20, 62 and 63 of said Branson et al. application without any change other than rearranging the leads and connections to the other figures so that the equipment as shown in Fig. 5 would cooperate with the circuits adjacent to these other figures. In other words, contacts 14 can be connected in series with the armature of the universal contacts of the reperforators shown in these figures. In addition, contacts 14 may also be connected in series with the armature of the universal contacts of the reperforators shown in Figs. 82 and 87 and in each case where these contacts are connected in series with the armature of the universal contacts of the reperforators in Figs. 19, 20, 45, 62, 63, 82 and 87, the circuit and system of said application will function substantially as described in said application, except as modified by the description herein.

Contacts 14, as described herein, may also be connected in series with the armature of the universal contacts in the reperforators shown in Figs. 28, 53 and 67 of said above-identified application of Branson et al. When these contacts are connected in series with the armature of the universal contacts of this latter group of reperforators, they merely cause an indicator and alarm to be actuated in a manner similar to the manner described hereinafter but do not make the reperforating equipment busy nor do they stop transmission as is the case with the first group of reperforators enumerated above.

As will be readily understood by those skilled in the art, contacts 14 may be provided in series with the armature of universal contacts of either group of reperforators enumerated above without being provided for the other group, or they may be provided for both groups. In addition, it is not essential that these contacts be provided for each perforator of either group. For those perforators for which the contact is not provided, the operation will be as described in the above-identified application of Branson et al., whereas for each reperforator for which contacts are provided, the operation will be as described in said Branson et al. application as modified by the description herein.

Turning now to the operation of the circuits as shown in Figs. 5 and 6, which is similar to the operation of the corresponding contacts which are provided for any other reperforator of the first group enumerated above, when the reperforator is idle, relays 610, 611, 612, 613, 614 and 623 are released. Relays 622 and 624 are operated as shown in the drawings. Relay 624 is operated in a circuit extending from battery through its winding, to ground to the lower break contacts of relay 612. Relay 622 is maintained operated in a circuit extending from battery through its winding to ground, through the lower operated contacts of relay 624.

When the reperforator 506 is seized under control of an address code, as described in said above-identified application of Branson et al., relay 613 will be operated. A little later relay 614 is operated and then relay 613 released. Upon the release of relay 613, a circuit will be completed for the operation of relay 612. The operation of relay 612 completes a circuit for the operation of relay 611 from battery, through the winding of relay 611 to ground, through the lower inner operated contacts of relay 612. Relay 611, in operating, connects ground to lead 619 and thus makes reperforator 506 busy and prevents it from being seized by any of the other switching equipment.

A short time interval after relay 612 operates, under normal operation of the system, signals will be transmitted to the reperforator 506. The operation of relay 612, as described above, interrupts the operating circuit of relay 624, which relay in releasing, interrupts the operating circuit of relay 622. Relays 624 and 622 are slow release relays and maintain their armature operated for an appreciable interval of time after the circuit through their windings is interrupted. Consequently, under normal operation of the system, signals will be received by the reperforator 502 prior to the release of relay 622. If no signals are received by reperforator 506 or this reperforator does not respond to the signals due to some trouble condition, relay 622 will release and complete a circuit for the operation of relay 613 as described hereinafter. Relay 622, in releasing, will also short-circuit resistance 628. This mode of operation of the circuit has been described in detail in said above-identified application of Branson et al. and need not be repeated in greater detail here.

If for any reason contacts 14 are open at the time reperforator 506 is seized, the circuits will respond in the same manner as indicated above when no signals are received or the reperforator 506 does not respond to them.

Assume now that signals are received during the release time of relays 622 and 624, that contacts 14 are closed, and that the reperforator 506 responds by the received signals. During the response of the reperforator 506 to any code combination, the universal contacts 540 are momentarily operated and complete a circuit for the operation of relay 623 from battery, through the winding of relay 623, the upper inner operated contacts of relay 621, to ground through the momentarily operated universal contacts 540 and the closed contacts 14.

Relay 623 in operating, completes a circuit for maintaining itself operated from battery, through its winding and the upper inner operated contacts of relay 621 to ground, through the upper operated contacts of relay 623. The operation of relay 622 also completes a circuit for maintaining relay 622 operated from battery, through the winding of relay 622 and the lower operated contacts of relay 623, through the normal contacts of the universal contacts 540 to ground through closed contacts 14. During the normal operation of the reperforator 506, the universal contacts 540 will be in their normal or unoperated position a sufficiently long interval of time during or following the reception of each code combination to maintain the slow-release relay 622 operated. Consequently, relay 610 will not be operated and resistance 628 will not be short-circuited.

If for any reason contacts 540 are not operated during the releasing time of relays 624 and 622, relay 622 in releasing, causes the operation of relay 610 in a circuit extending from battery through its winding and the upper break contacts of relay 622 to ground, through the lower outer operated contacts of relay 612. Relay 610 in operating, completes an obvious circuit for lighting the tape-out lamp 533, connects ground to alarm lead 638 for actuating an alarm and also connects ground to lead 619, thus maintaining the reperforator 506 busy and preventing it from being seized by any other of the switching equipment.

The release of relay 622 also short-circuits resistance 628 and stops the transmission of signals to the reperforator 506 and actuates alarm devices and the indicator 350 associated with the transmitter then transmitting to reperforator 506 so that not only may the reperforator 506 be readily located by the maintenance force, but also a transmitter connected thereto so that any trouble which may have developed in the transmitter connected to the reperforator 506 may be readily located.

Of course, if contacts 14 are open, due to the fact that one or the other of the tape advancing mechanisms is not properly advancing the tape through the device, relay 623 will not operate. Consequently, relay 622 will release immediately. After reperforator 506 has been seized, circuits respond in the same manner as if reperforator 506 did not receive signals or failed to respond to the signals transmitted to it.

If contacts 14 open during the transmission of a message to the reperforator 506, they interrupt the holding circuit described above for relay 622, which relay will then release and complete a circuit for the operation of relay 610, as described above, and also short-circuit resistance 628. With resistance 628 short-circuited, the transmission from the transmitter transmitting to the reperforator 506 is interrupted. Relay 610 in operating, connects ground to the alarm lead 638 and to the busy or test lead 619. Relay 610 in operating, also completes an obvious circuit for lighting lamp 533, thus indicating the particular reperforator 506 is in trouble. Thereafter, the operator or attendant may determine the cause of the trouble and if one or the other of the tape advancing mechanisms is functioning improperly the operator or attendant will either replace the machine or correct the trouble; then by properly operating keys, as described in the above-identified application of Branson et al., the operator may restore the circuit to its normal or idle condition. The attendant may also remove a portion of the message from the tape in the reperforator 506 and reset the tape in the transmitter transmitting to this reperforator so that a complete message will be perforated in the tape by reperforator 506 for later transmission to the proper subscriber's station, as described in said Branson et al. application.

Thus, the operation of contacts 14, due to improper operation of either of the tape advancing mechanisms of the reperforator 506 causes (1) the lamp 533 to operate to indicate the reperforator in trouble; (2) causes an alarm to be actuated to attract the attention of the operator or maintenance people; (3) connects ground to the busy test lead and makes the reperforator test busy so that it will not be seized by any other of the switching equipment so long as the trouble condition remains, and (4) stops the operation of the transmitter transmitting to the reperforator 506 and actuates indicators and other alarms to attract the attention of the maintenance people and indicate the particular transmitter transmitting to reperforator 506.

What is claimed is:

1. In a telegraph switching system, a recording instrument, a supply of stationary therefor, means for advancing said stationary through said instrument, switching apparatus for automatically selecting and establishing a transmission path to said instrument under control of received signals, busy indicating apparatus for said instrument, and means responsive to improper operation of said stationary advancing means for interrupting transmission over said established path and making said instrument test busy to prevent selection thereof by said switching apparatus.

2. In a switching system, a telegraph reperforator for perforating a tape in accordance with received telegraph signals, apparatus for advancing said tape through said reperforator past two fixed points therein, and apparatus controlled by the amount of tape between said two points for making said reperforator busy and preventing transmission of signals to it.

3. In a telegraph recording instrument, apparatus for advancing a recording medium past two points in said recording instrument, a switching device operated in the same manner by an increase and a decrease in the recording medium between said two points, switching equipment for directing messages to said recorder, and apparatus responsive to the operation of said switching device for preventing said switching equipment from directing further messages to said recorder.

4. In a telegraph recording instrument, apparatus for advancing a recording medium past two points in said recording instrument, a switching device operated in the same manner by an increase and a decrease in the recording medium between said two points, switching equipment for directing messages to said recorder, and apparatus responsive to the operation of said switching device for preventing said switching equipment from directing further messages to said recorder, indicating apparatus indicating both the recording instrument in which the record medium is not properly advanced therethrough and the origin of the message which is then being transmitted.

5. In a telegraph switching system a signal recorder, switching apparatus automatically controlled by telegraph signals for selecting said recorder under control of predetermined telegraph signals, apparatus for advancing a recording medium through said recorder in response to reception of signals thereby, and apparatus responsive to the improper operation of said advancing apparatus for preventing the selection of said recorder by said switching apparatus.

6. In combination a telegraph recording instrument for recording received telegraph signals on a recording medium, switching apparatus automatically controlled by telegraph signals for automatically selecting said recording instrument in response to predetermined telegraph signals and thereafter establishing a transmission path thereto and apparatus responsive to reception of telegraph signals by said recording instrument for advancing a recording medium therethrough, and equipment responsive to a failure of operation of said advancing apparatus for thereafter preventing the selection of said recording instrument by said switching apparatus.

WALTER M. BACON.